Figure 1:
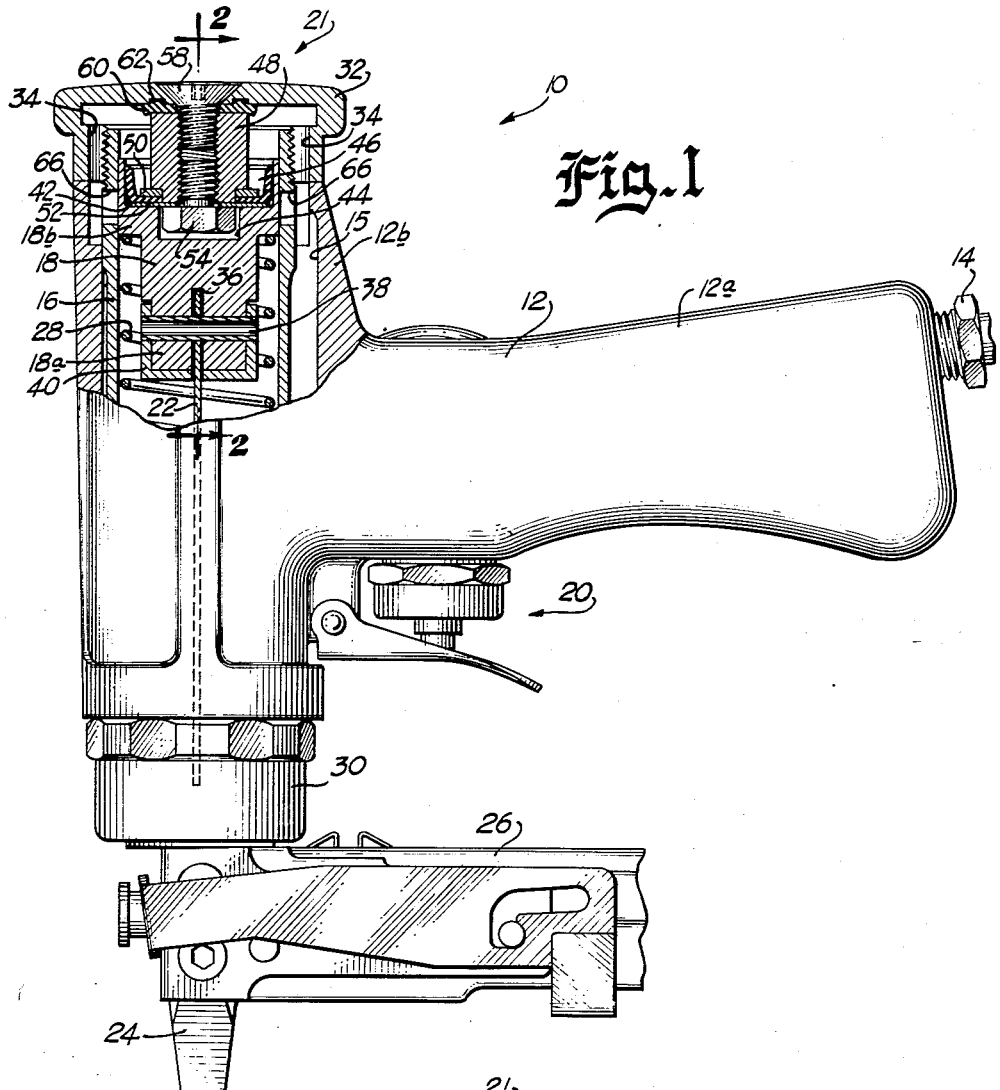

Sept. 20, 1960     O. A. WANDEL ET AL     2,953,117

FASTENER DRIVING APPARATUS

Filed Aug. 23, 1957

INVENTORS
OSCAR A. WANDEL AND
FRANK W. MULLANEY

BY Mason, Kolehmainen,
Rathburn and Wyss.

ATTORNEYS.

United States Patent Office 2,953,117
Patented Sept. 20, 1960

2,953,117

FASTENER DRIVING APPARATUS

Oscar A. Wandel, Mundelein, and Frank W. Mullaney, Villa Park, Ill., assignors to Fastener Corporation, Chicago, Ill., a corporation of Illinois Filed Aug. 23, 1957, Ser. No. 679,812

9 Claims. (Cl. 121—13)

This invention relates to a pneumatically operated fastener driving apparatus and, more particularly, to such an apparatus including new and improved means for retarding the initiation of the power stroke of a fastener driving piston.

In pneumatically actuated apparatus for driving fasteners, such as staples and nails, the depths to which the fasteners can be driven is reduced by undesirable reductions in the pressure of the compressed air acting on the blade driving piston. These pressure reductions are largely due to the turbulence which arises out of the provision of somewhat restricted passageways between the compressed air line or reservoir and the cylinder for the piston. One manner of increasing the force available for driving the piston in its power stroke is to provide a large volume of compressed air in a reservoir disposed immediately adjacent the drive cylinder which is placed in communication with the drive cylinder through an opening of large area. Another expedient which has been adopted by the prior art is to provide pressure responsive latching means which, following the actuation of the fastener driving apparatus, retain the piston in a normal position and prevent its downward movement until such time as sufficient air pressure has built up in the cylinder behind the piston. However, these prior latching devices are relatively expensive to fabricate and unduly increase the size of hand tools, such as pneumatically operated tackers and staplers.

Accordingly, one object of the present invention is to provide new and improved fastener driving apparatus.

Another object is to provide a pneumatically operated fastener driving apparatus including new and improved means for retarding the initiation of the power stroke of a fastener driving piston.

Another object is to provide a piston retarding means in a fastener driving tool which is rendered effective to retard the displacement of a piston in response to the admission of a compressed fluid medium into the piston cylinder.

A still further object is to provide a pneumatically responsive latching means for a piston which includes a fixed flexible member which is received within a recess formed in a piston and which is responsive to the admission of compressed air into the cylinder for retarding the displacement of the piston.

Another object is to provide a compact and economically fabricated latching device for delaying the initiation of the power stroke of a piston.

In accordance with these and many other objects, an embodiment of the present invention comprises a pneumatically actuated tacker of the type shown and described in detail in the copending application of Oscar A. Wandel, Serial No. 527,697, filed August 11, 1955, which application is assigned to the same assignee as the present application. The pneumatically operated tacker disclosed in this copending application generally comprises a housing having a chamber closed by a cap within which is disposed a cylinder. A piston slidably mounted in the cylinder is provided at its lower end with a fastener driving blade which projects outwardly from the cylinder into a drive track formed in a nosepiece. When a manually controlled trigger assembly in the device shown in this prior application is actuated to admit air to an open end of the cylinder which is disposed adjacent the closure cap, the piston immediately moves downwardly so that the driver blade engages and drives a staple or tack supplied to the drive track from a magazine. When the control valve is released to terminate the flow of compressed air into the open end of the cylinder, a piston return spring returns the piston to its normal position.

In accordance with the present invention, the pneumatically operated tacker or nailer disclosed in the above identified application is provided with pneumatically controlled means for retarding the initiation of the downward power stroke of the blade driving piston until such time as the compressed air is supplied to the open end of the piston at substantially full line pressure. The retarding or latching assembly includes a cup shaped flexible member which is secured to a supporting means depending from the closure cap and which is slidably received within a cylindrical recess formed in the upper end of the piston. When compressed air is admitted to the open end of the cylinder, it acts on the upper surface of the flexible member to bias it into gripping engagement with the recessed portion of the piston, thereby effectively preventing immediate downward movement of the piston under the control of the air admitted to the cylinder. A passageway, which places the lower end of the recess in communication with the cylinder, bleeds air into the recess at a predetermined rate so that, following a suitable time delay sufficient to permit the compressed air supplied to the upper end of the cylinder to reach full line pressure, the pressure of the compressed air acting on both surfaces of the flexible member become substantially equalized.

At this time, the flexible member no longer is biased against the walls of the piston recess to retard its downward movement. As the piston begins to move downwardly, it uncovers a pair of ports which admit the compressed air supplied to the chamber into the cylinder behind the piston. The compressed air provided by these ports together with the compressed air supplied at the open end of the cylinder rapidly drives the piston downwardly so that a fastener is driven into the workpiece. When the manually controlled valve is released, the piston return spring restores the piston to its normal position in which the cup shaped flexible member is received within the recess and also moves the piston into engagement with the supporting means for the flexible member which serves as a stop for holding the piston in its normal position.

Figure 2:
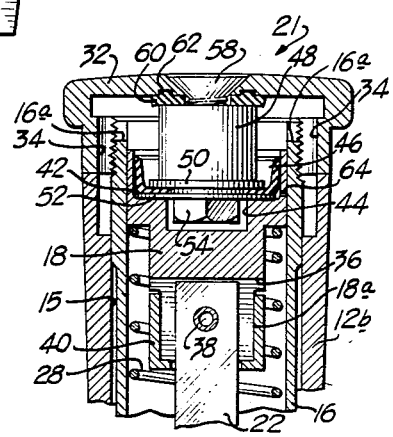

Many other objects and advantages of the present invention will become apparent from the following detailed description when considered in conjunction with the following drawings wherein:

Fig. 1 is a side elevational view in partial section of a pneumatically operated tacker embodying the present invention; and Fig. 2 is a cross-sectional view taken along line 2—2 in Fig. 1 assuming that the complete structure is disclosed therein.

Referring now to the drawings, therein is shown a pneumatically operated tacker 10 which embodies the present invention and which is identical to the tacker disclosed in the above identified copending Wandel application except as modified by the disclosures herein. In general, the tacker 10 includes a housing 12 comprising a hollow handle portion 12a, which provides a compressed air reservoir to which compressed air is supplied by an inlet nipple 14, and an upstanding cylindrical portion 12b defining a cavity 15 within which is positioned a cylinder 16. A piston 18 is slidably mounted in the cylinder 16 so that, when a manually actuated trigger valve assembly 20 is operated, compressed air from the reservoir in the hollow handle 12a is admitted to the cavity 15 to be supplied to the open end of the cylinder 16 for driving the piston 18 downwardly.

The tacker 10, however, includes a new and improved delay or piston retarding assembly, indicated generally as 21, for delaying downward movement of the piston 18 until such time as the compressed air admitted to the cavity 15 and to the upper end of the cylinder 16 by the operation of the valve assembly 20 attains full line pressure. At this time, the delay device 21 is rendered ineffective to retard downward movement of the piston 18 and this piston moves downwardly so that a driver blade 22 connected thereto moves downwardly through a drive track formed in a nosepiece 24 to drive a staple supplied to the drive track by a magazine assembly 26 into a workpiece. When the control valve assembly 20 is released, a piston return spring 28, which is interposed between the bottom of the cylinder 16 and the lower edge of the piston 18, returns the piston 18 to the normal position illustrated in the drawings.

Referring now more specifically to the construction of the housing 12 for the tacker 10, the cylinder 16, which is removably disposed in the cylindrical cavity 15, is connected at its lower end to the nosepiece 24 by a threaded coupling member 30 having an inwardly turned lower edge which engages a flanged portion on the nosepiece 24 and an internally threaded upper portion which engages threads formed on the lower end of the cylinder 16. The upper end of the cavity 15 is closed by a closure cap 32 which is threadedly connected to the upper end of the cylinder 16. Thus, when the closure cap 32 is threaded downwardly on the upper end of the cylinder 16, the lower edge of this cap is firmly seated on the upper edge of the cylindrical portion 12b of the housing 12 to close off or seal the upper end of the cavity 15. To provide means for supplying the compressed air admitted to the cavity 15 under the control of the valve assembly 20 to the upper and open end of the cylinder 16, the threaded inner surface of the cap 32 is provided with four semi-cylindrical recesses 34 and the upper end of the cylinder 16 is provided with a plurality of recessed portions 16a.

Referring now more specifically to the construction of the piston 18, this piston is preferably formed of a light weight material such as aluminum. It is possible to use a lower weight piston and yet attain sufficient force for driving a fastener because the retarding assembly 21 delays the initiation of the power stroke of the piston 18 until compressed air at substantially full line pressure is available. The light weight piston 18, when driven by compressed air at full pressure, moves downwardly at increased speeds to provide a suitable driving force. The lower weight of the piston 18 also reduces the recoil shock provided incident to arresting its power stroke and thus improves the ease of operating the tacker 18.

The piston 18 includes a reduced diameter portion 18a which is provided with a slot 36 within which the upper end of the driver blade 22 is secured by a hollow pin 38. A cap 40 of case hardened steel, which is also secured to the piston 18 by the pin 38, encloses the reduced diameter portion 18a to prevent damage to the lower end of the piston when it engages a bumper assembly at the end of its power stroke. The piston 18 is provided with a shouldered portion 18b against which the upper end of the piston return spring 28 bears for returning the piston 18 to the normal position illustrated in the drawings at the end of each power stroke. A cylindrical recess 42 formed in the upper end of the piston 18 forms a part of the retarding assembly 21 and an additional recess 44 is also provided for receiving a portion of the supporting structure for the retarding assembly 21.

Referring now more specifically to the piston retarding or delay assembly 21, this assembly includes a somewhat cup-shaped flexible element 46 which is slidably received within the cylindrical recess 42 in the upper end of the piston 18. The flexible member 46 is secured to a cylindrical supporting member 48 by a pair of washers 50 and 52 which engage opposite sides of the flexible element 46 and which are secured to a lower end of the supporting post 48 by a headed fastener 54. The upper end of the supporting post 48 is secured to the closure cap 32 by a machine screw 58. A resilient gasket 60, which is interposed between the upper surface of the supporting post 48 and the lower surface of the closure cap 32 and which is forced into spaced recesses 62 in the lower surface of the cap 32 when the machine screw 58 is tightened, prevents rotation of the post 48 relative to the closure cap 32. The supporting post 48 and the flexible element 46 carried thereon extend downwardly into the open end of the cylinder 16 so that the lowermost washer 52 is adapted to engage the piston 18 to limit its upward movement under the control of the piston return spring 28 and thus provide a stop for locating the piston 18 in its normal position.

When the tacker 10 is to be operated to drive a fastener, such as a staple or nail, into a workpiece, the manually controlled valve assembly 20 is actuated to admit compressed air from the reservoir provided in the hollow handle 12a into the cavity 15 defined by the cylindrical portion 12b of the housing. This compressed air flows upwardly through the recesses 34 formed in the closure cap 32 to be admitted to the open upper end of the cylinder 16. This compressed air acts on the flexible element 46 to force its outer surface into intimate gripping engagement with the annular inner surface of the cylindrical recess 42 formed in the upper end of the piston 18. By thus forcing the flexible element 46 into engagement with the annular wall surface of the recess 42, a force is provided which prevents the piston 18 from being driven downwardly by the compressed air supplied to the open end of the cylinder 16. Accordingly, the downward movement of the piston 18 is delayed or retarded to permit the compressed air admitted into the cavity 15 to attain full line pressure and thus the pressure reducing effect of the turbulence due to the passageways provided in the main valve assembly 20 is overcome.

To provide a means for releasing the delay assembly 21 after full line pressure has been attained by the compressed air in the cavity 15, this assembly includes a passageway 64 (Fig. 2) which places the lower portion of the cylindrical recess 42 in communication with the interface between the outer surface of the piston 18 and the inner surface of the cylinder 16. After a suitable time delay period, sufficient compressed air passes from the upper open end of the cylinder 16 downwardly through the interface and through the passageway 64 into the lower portion of the cylindrical recess 42 to equalize the pressure of the compressed air acting on the upper and lower surfaces of the flexible element 46. This equalization of pressure destroys the gripping action of the flexible element 46 relative to the piston 18 and thus permits this piston to move slowly downward under the force of the compressed air supplied at the upper end of the cylinder 16.

As the piston 18 moves downwardly, the upper edge thereof uncovers a plurality of openings 66 formed in the walls of the cylinder 16 adjacent the upper end thereof to permit a large volume of compressed air at full line pressure to rapidly pass from the cavity 15 into the cylinder 16. This compressed air drives the light weight piston 18 downwardly at a high speed so that the driver blade 22 engages and drives the fastener supplied by the magazine assembly 26. When the valve assembly 20 is released, the compressed air in the cavity 15 and in the cylinder 16 is exhausted to the atmosphere, and the piston return spring 28 elevates the piston 18 to the normal position illustrated in the drawings. In thus moving upwardly, the flexible element 46 is again received within the recess 42 formed in the upper end of the piston 18 and the head of the fastener 54 is received within the recess 44. The upward movement of the piston 18 under the control of the spring 28 is terminated when the lower wall of the cylindrical recess 42 moves into engagement with the washer 52 carried on the supporting post 48.

In summary, the pneumatically operated tacker 10 of the present invention includes the delay or retarding assembly 21 which is rendered effective upon the admission of compressed air into the cavity 15 by the valve assembly 20 to delay the downward movement of the piston 18 by forcing the flexible element 46 into gripping engagement with the annular wall surface of the recess 42. The passageway 64, by admitting compressed air at a slow rate to the lower portion of the recess 42, equalizes the pressures acting on the two sides of the flexible element 46 to subsequently release the piston 18 for downward movement at increased speeds due to the compressed air at full pressure supplied through the ports or openings 66. Accordingly, the present invention provides a delay device of simple and economical construction which is effective to delay the downward movement of the piston 18 until such time as the full line pressure of the compressed fluid medium has been attained, thus increasing the depths to which fasteners can be driven by light weight pistons having a reduced recoil effect.

Although the present invention has been described by reference to a particular embodiment thereof, it will be understood that those skilled in the art may make many changes and modifications therein without departing from the principles of this invention.

What is claimed as new and desired to be secured by Letters Patent of the United States is:

1. A fastener driving apparatus comprising a cylinder, a piston slidable in said cylinder and having a recessed portion, a fastener driver blade actuated by said piston and extending outwardly from said piston away from said recessed portion, means for supplying a compressed fluid medium to said cylinder to displace said piston, and piston retaining means including a flexible member disposed in said recessed portion for retarding displacement of said piston by said medium, said piston including a passageway located between said flexible member and said driver blade for placing said recessed portion in communication with said cylinder to release said piston retaining means to permit actuation of said piston by said compressed fluid medium.

2. A fastener driving apparatus comprising a housing, a cylinder disposed in said housing and having an open end, a piston slidably mounted in said cylinder and having a recess therein, said piston normally being positioned adjacent said open end, supporting means on said housing and projecting downwardly therefrom into said open end of said cylinder, a flexible member connected to said supporting means and disposed in said recess, fluid conveying means for supplying a compressed fluid medium to the open end of said cylinder for displacing said piston, said medium acting on one side of said flexible member so that it grips said piston to momentarily retard the displacement thereof by said medium, and second fluid conveying means for supplying a compressed fluid medium to the other side of said flexible member to release said piston for movement.

3. The fastener driving apparatus set forth in claim 2 including means for biasing said piston toward said open end and in which said supporting means engages said piston to locate said piston adjacent the open end of said cylinder.

4. The fastener driving apparatus set forth in claim 2 in which said second fluid conveying means includes a passageway formed in said piston connecting said recess and said cylinder.

5. The fastener driving apparatus set forth in claim 2 in which said cylinder includes an opening spaced from said open end which is closed by said piston in the normal position of said piston and which is opened to admit said medium to said cylinder after said piston has been displaced from its normal position.

6. In a pneumatically operated fastener driving device, a housing, a cylinder in said housing, a piston slidably mounted in said cylinder and having a recessed portion, a fastener driver blade connected to said piston and extending away from said recessed portion, a flexible member carried on said housing and normally disposed within said recessed portion, a first fluid conveying system for admitting a compressed fluid medium to said cylinder at the side of said piston spaced from said driver blade, said compressed fluid medium forcing said flexible member into gripping engagement with said recessed portion of said piston to prevent movement of said piston by said medium, and a second fluid conveying system for admitting said compressed fluid medium into said recessed portion to release said piston for movement relative to said cylinder.

7. The fastener driving device set forth in claim 6 including at least one port which is normally closed but which is opened to supply said compressed fluid medium to said cylinder following movement of said piston relative to said cylinder.

8. The fastener driving device set forth in claim 6 in which said second fluid conveying system includes a passageway passing through said piston and opening into said recessed portion at a position spaced between said driver blade and said flexible member.

9. A fastener driving apparatus comprising a housing defining a cavity, a cylinder in said cavity having an open end and an opening spaced from said open end, a piston movably mounted in said cylinder and having a cylindrical recess at one end, a fastener driving blade actuated by said piston and extending outwardly from the other end of said piston, supporting means on said housing extending downwardly into the open end of said cylinder, a cup-shaped flexible member carried on said supporting means and disposed in said recess, biasing means for urging said piston toward the open end of said cylinder to a normal position in which said flexible member is disposed in said recess and said supporting means engages said piston, and fluid conveying means for supplying compressed air to the open end of said cylinder, said compressed air biasing said flexible member against said piston to retard displacement of said piston by said compressed air, said piston including a restricted passageway opening into said recess to equalize the pressure of the compressed air acting on both sides of said flexible member to permit displacement of said piston by the compressed air supplied by said fluid conveying means, said opening in said cylinder admitting compressed air to said cylinder for driving said piston after a predetermined displacement of said piston.

References Cited in the file of this patent

UNITED STATES PATENTS

| | | |
|---|---|---|
| 2,535,588 | Mead | Dec. 26, 1950 |
| 2,786,450 | Jacobus et al. | Mar. 26, 1957 |
| 2,801,415 | Jenny | Aug. 6, 1957 |
| 2,818,570 | Faccou | Jan. 7, 1958 |

FOREIGN PATENTS

| | | |
|---|---|---|
| 769,544 | Great Britain | Mar. 6, 1957 |